US008952983B2

(12) United States Patent
Uusitalo et al.

(10) Patent No.: US 8,952,983 B2
(45) Date of Patent: Feb. 10, 2015

(54) METHOD AND APPARATUS FOR ANNOTATING POINT OF INTEREST INFORMATION

(75) Inventors: Jussi Severi Uusitalo, Hämeenlinna (FI); Juha Henrik Arrasvuori, Tampere (FI); Kimmo Tapio Roimela, Tampere (FI)

(73) Assignee: Nokia Corporation, Espoo (FI)

( * ) Notice: Subject to any disclaimer, the term of this patent is extended or adjusted under 35 U.S.C. 154(b) by 243 days.

(21) Appl. No.: 12/939,558

(22) Filed: Nov. 4, 2010

(65) Prior Publication Data
US 2012/0113138 A1 May 10, 2012

(51) Int. Cl.
G09G 5/00 (2006.01)
G06Q 30/02 (2012.01)
G06Q 10/04 (2012.01)

(52) U.S. Cl.
CPC .............. G06Q 30/02 (2013.01); G06Q 10/047 (2013.01)
USPC ........................................................ 345/629

(58) Field of Classification Search
CPC .............................. G06Q 10/047; G06Q 30/02
See application file for complete search history.

(56) References Cited

U.S. PATENT DOCUMENTS

| 7,053,916 B2 | 5/2006 | Kobayashi et al. |
| 2002/0130906 A1 | 9/2002 | Miyaki |
| 2003/0169903 A1 | 9/2003 | Yoshikawa et al. |
| 2005/0011959 A1 | 1/2005 | Grosvenor |
| 2005/0051623 A1 | 3/2005 | Okuda et al. |
| 2005/0085999 A1 | 4/2005 | Onishi |
| 2006/0002590 A1 | 1/2006 | Borak |
| 2007/0053551 A1 | 3/2007 | Kubo et al. |
| 2007/0162942 A1 | 7/2007 | Hamynen et al. |
| 2007/0192020 A1 | 8/2007 | Brulle-Drews et al. |
| 2008/0106594 A1 | 5/2008 | Thrun |
| 2008/0211809 A1 | 9/2008 | Kim et al. |
| 2008/0240573 A1 | 10/2008 | Nakamura et al. |
| 2009/0043504 A1* | 2/2009 | Bandyopadhyay et al. .. 701/213 |
| 2009/0109216 A1* | 4/2009 | Uetabira ....................... 345/419 |
| 2009/0115776 A1 | 5/2009 | Bimbra et al. |
| 2010/0161658 A1 | 6/2010 | Hamynen et al. |
| 2010/0214291 A1 | 8/2010 | Muller et al. |
| 2011/0063295 A1* | 3/2011 | Kuo et al. ..................... 345/426 |

FOREIGN PATENT DOCUMENTS

| AU | 2007362729 A1 | 7/2009 |
| CA | 2 709 740 A1 | 7/2009 |

(Continued)

OTHER PUBLICATIONS

International Search Report for related International Patent Application No. PCT/FI2011/050853 dated Feb. 13, 2012, pp. 1-7.

(Continued)

*Primary Examiner* — Kee M Tung
*Assistant Examiner* — Frank Chen
(74) *Attorney, Agent, or Firm* — Ditthavong & Steiner, PC

(57) ABSTRACT

An approach is provided for annotating point of interest information to structures. One or more representations of at least one structure are determined. One or more partitions of the at least one structure is determined based, at least in part, on one or more features of the one or more representations. One or more points of interest associated with the at least one structure are determined. One or more points of interest are determined to be rendered for presentation based, at least in part, on the one or more partitions.

20 Claims, 8 Drawing Sheets

(56) References Cited

FOREIGN PATENT DOCUMENTS

| | | |
|---|---|---|
| CN | 1928494 A | 3/2007 |
| CN | 101275841 A | 10/2008 |
| CN | 101379369 A | 3/2009 |
| CN | 101903745 A | 12/2010 |
| DE | 20 2007 018 604 U1 | 4/2009 |
| DE | 20 2007 018 605 U1 | 4/2009 |
| EP | 1 612 707 A2 | 1/2006 |
| EP | 1 681 537 A1 | 7/2006 |
| EP | 1 971 825 A1 | 9/2008 |
| EP | 1 975 565 A2 | 10/2008 |
| EP | 2 104 074 A1 | 9/2009 |
| EP | 2 183 724 A1 | 5/2010 |
| EP | 2 223 041 A1 | 9/2010 |
| GB | 2 413 021 A | 10/2005 |
| JP | 2002-340588 A | 11/2002 |
| JP | 2003-263104 A | 9/2003 |
| JP | 2005-083941 A | 3/2005 |
| JP | 2005-121650 A | 5/2005 |
| JP | 2006-030208 A | 2/2006 |
| JP | 2007-074326 A | 3/2007 |
| JP | 2008-0250687 A | 10/2008 |
| JP | 2010-238098 A | 10/2010 |
| JP | 2011-506983 A | 3/2011 |
| KR | 20080076611 A | 8/2008 |
| KR | 200800884859 A | 9/2008 |
| NL | 2002099 C2 | 6/2009 |
| NL | 2002105 A1 | 6/2009 |
| NL | 2002105 C | 4/2011 |
| RU | 2008 132 293 A | 2/2010 |
| WO | WO 2005/098362 A1 | 10/2005 |
| WO | WO 2007/080473 A1 | 7/2007 |
| WO | WO 2008/024949 A2 | 2/2008 |
| WO | WO 2009/015501 A1 | 2/2009 |
| WO | WO 2009/080070 A1 | 7/2009 |

OTHER PUBLICATIONS

International Search Report for related International Patent Application No. PCT/FI2011/050864 dated Feb. 20, 2012, pp. 1-7.

International Written Opinion for related International Patent Application No. PCT/FI2011/050853 dated Feb. 13, 2012, pp. 1-9.

International Written Opinion for related International Patent Application No. PCT/FI2011/050864 dated Feb. 20, 2012, pp. 1-9.

Automatic Extraction of Builing Features from Terrestrial Laser Scanning, Pu et al., accessed on: Dec. 22, 2010, http://www.itc.nl/personal/vosselman/papers/pu2006.dresden.pdf, pp. 1-5.

Data Management Strategies for Mobile Augmented Reality, Reitmayr, et al., accessed on: Dec. 22, 2010, http://www.ims.tuwien.ac.at/media/documents/publications/reitmayrstars2003.pdf, pp. 1-6.

Evaluation of Alternative Label Placement Techniques in Dynamic Virtual Environments, Peterson et al., Lecture Notes in Computer Science, 2009, vol. 5531/2009, abstract only, http://www.springerlink.com/content/917015636335m625/, pp. 1-2.

Google maps, accessed on: Dec. 22, 2010, http://maps.google.com/help/maps/streetview/, 1 page.

Layar, accessed on: Dec. 22, 2010, http://www.layar.com/, 1 page.

osm-3D Europe, accessed on: Dec. 22, 2010, http://koenigstuhl.geog.uni-heidelberg.de/osm-3d/informationen.en.htm#pois, pp. 1-8.

The Interactive 3D BreakAway Map: a navigation and examination aid for multi-floor 3D worlds, Chittaro et al., International Conference on Cyberworlds, Nov. 23-25, 2005, abstract only, http://ieeexplore.ieee.org/application/enterprise/entconfirmation.jsp?arnumber=01587517, 1 page.

Wikitude, accessed on: Dec. 22, 2010, http://www.wikitude.org/en/, pp. 1-4.

Office Action for corresponding Russian Application No. 2013126366, dated Aug. 8, 2014, 8 pages.

* cited by examiner

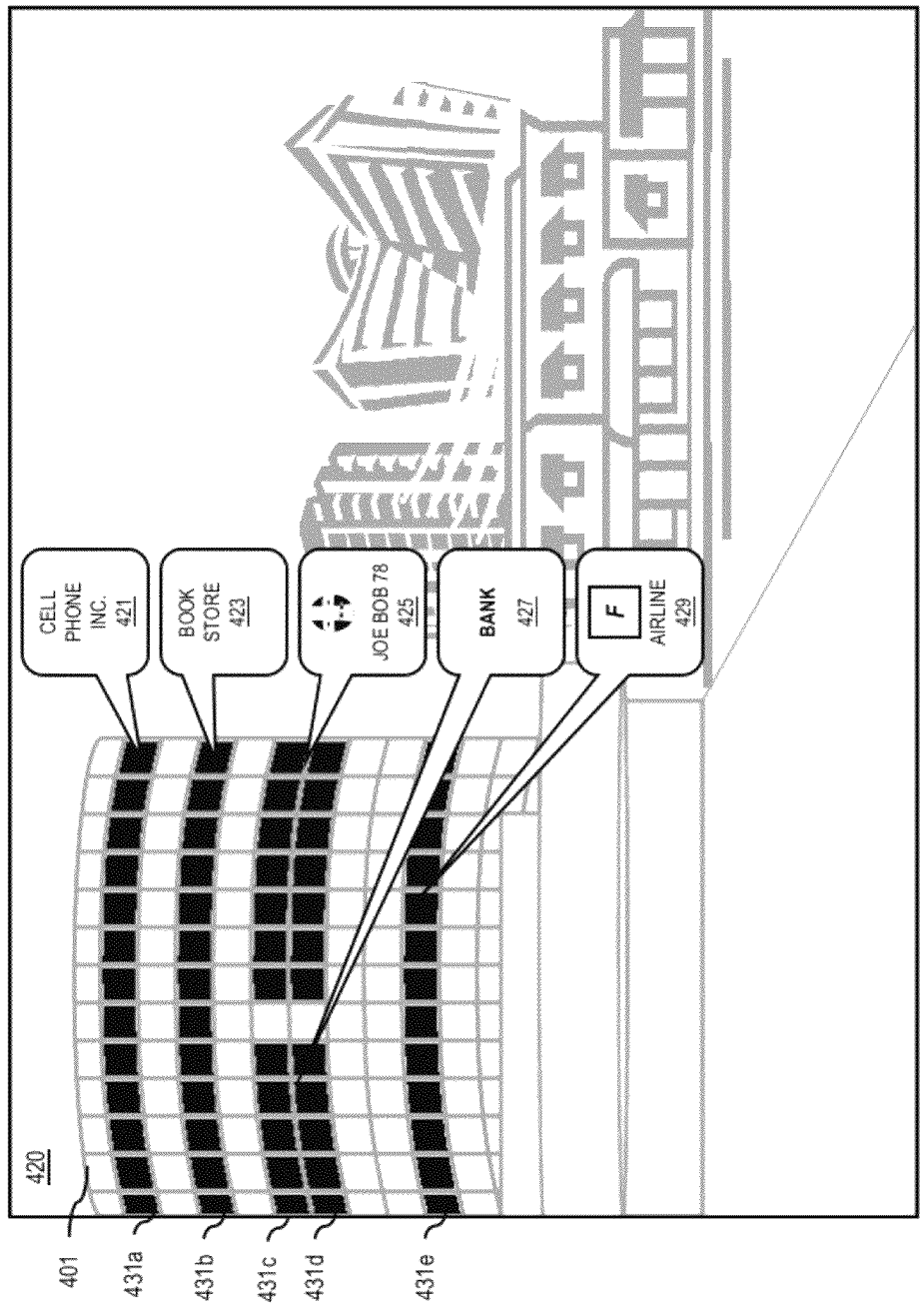

METHOD AND APPARATUS FOR ANNOTATING POINT OF INTEREST INFORMATION

BACKGROUND

Service providers and device manufacturers (e.g., wireless, cellular, etc.) are continually challenged to deliver value and convenience to consumers by, for example, providing compelling network services. One area of interest has been the development of location-based services (e.g., navigation services, mapping services, augmented reality applications, etc.) that have greatly increased in popularity, functionality, and content. Augmented reality and mixed reality applications allow users to see a view of the physical world merged with virtual objects in real time. Mapping applications further allow such virtual objects to be annotated to location information. However, currently, such annotations are coarsely presented to users (e.g., based on an address). As such, service providers and manufacturers face significant technical challenges to more usefully present annotations of location information to users.

SOME EXAMPLE EMBODIMENTS

Therefore, there is a need for an approach for annotating point of interest information based on partitioning of structures.

According to one embodiment, a method comprises determining one or more representations of at least one structure. The method also comprises determining one or more partitions of the at least one structure based, at least in part, on one or more features of the one or more representations. The method further comprises determining one or more points of interest associated with the at least one structure. The method also comprises determining to render the one or more points of interests for presentation based, at least in part, on the one or more partitions.

According to another embodiment, an apparatus comprises at least one processor, and at least one memory including computer program code, the at least one memory and the computer program code configured to, with the at least one processor, cause, at least in part, the apparatus to determine one or more representations of at least one structure. The apparatus is also caused to determine one or more partitions of the at least one structure based, at least in part, on one or more features of the one or more representations. The apparatus is further caused to determine one or more points of interest associated with the at least one structure. The apparatus is also caused to determine to render the one or more points of interests for presentation based, at least in part, on the one or more partitions.

According to another embodiment, a computer-readable storage medium carries one or more sequences of one or more instructions which, when executed by one or more processors, cause, at least in part, an apparatus to determine one or more representations of at least one structure. The apparatus is also caused to determine one or more partitions of the at least one structure based, at least in part, on one or more features of the one or more representations. The apparatus is further caused to determine one or more points of interest associated with the at least one structure. The apparatus is also caused to determine to render the one or more points of interests for presentation based, at least in part, on the one or more partitions.

According to another embodiment, an apparatus comprises means for determining one or more representations of at least one structure. The apparatus also comprises means for determining one or more partitions of the at least one structure based, at least in part, on one or more features of the one or more representations. The apparatus further comprises means for determining one or more points of interest associated with the at least one structure. The apparatus also comprises means for determining to render the one or more points of interests for presentation based, at least in part, on the one or more partitions.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A-4B are diagrams of user interfaces utilized in the processes of FIG. 3, according to various embodiments;

DESCRIPTION OF SOME EMBODIMENTS

Examples of a method, apparatus, and computer program for rendering point of interest information based on partitions of structures are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
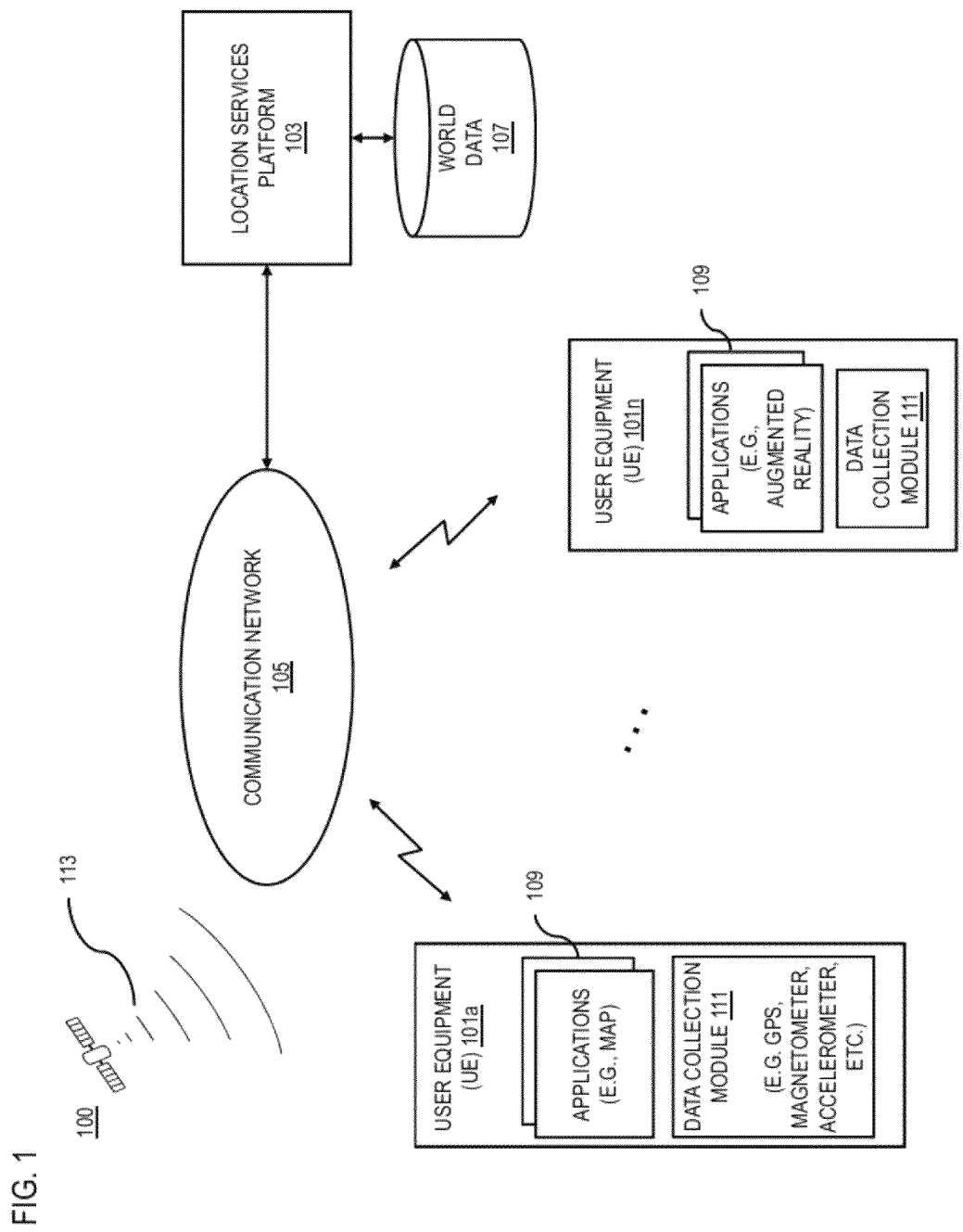
FIG. 1 is a diagram of a system capable of rendering point of interest information based on partitions of structures, according to one embodiment.

FIG. 1 is a diagram of a system capable of rendering point of interest information based on partitions, according to one embodiment. It is noted that mobile devices and computing devices in general are becoming ubiquitous in the world today and with these devices, many services are being provided. These services can include augmented reality (AR), mixed reality (MR), and other location based services and applications. AR allows a user's view of the real world to be overlaid with additional visual information. MR allows for the merging of real and virtual worlds to produce visualizations and new environments. In MR, physical and digital objects can co-exist and interact in real time. Thus, MR can be a mix of reality, AR, virtual reality, or a combination thereof. Although various embodiments are described with respect to AR, it is contemplated that the approach described herein may be used with other user interface situations such as MR, virtual reality, mapping applications, location based services application (e.g., a local POI search), etc.

Location based services and applications can be utilized to present one or more images with annotated content (e.g., based on AR, MR, etc.). Conventional systems rely on a two-dimensional dynamic for creating and presenting points of interest (POIs). However, the world is viewed in at least three dimensions (3D) by people (e.g., buildings have a height and depth). For example, a skyscraper may offer many different services and establishments across multiple floors. However, because of the two dimensional functionality of systems utilized to show such POIs, often users are left without means for being able to distinguish between the information associated with the POIs. For example, a lack of vertical separation of POIs leads to challenges in identifying one POI from other POIs.

To address this problem, a system 100 of FIG. 1 introduces the capability to render point of interest information based on partitions. In certain embodiments, a partition is a separation that can be utilized to spread information. For example, one or more horizontal partitions can be utilized to vertically separate POIs associated with a structure (e.g., a building) or vertical partitions can be utilized to horizontally separate POIs. Further, combinations of vertical partitions, horizontal partitions, and/or irregular (e.g., curved) partitions may be utilized to spread POI information. Although various embodiments are described with respect to horizontal partitions, it is contemplated that the approach described herein may be used with other types of partitions. These partitions can be detected from one or more sources (e.g., based on an analysis of one or more images, schematic data, etc.). Further, the partitions can be compared to information associated with POIs. This comparison can be utilized to generate representations of the POIs to be presented on one or more images (e.g., a streaming camera feed) of user equipment (UEs) 101a-101n.

UEs 101 can communicate with a location services platform 103 via a communication network 105 to utilize world data 107 to generate and present location based information to users of the UEs 101. Applications 109, such as a map application, a navigation application, AR application, or the like executing on the UE 101 can be utilized to process world data 107 and present the world data (e.g., panoramic images, POI information, etc.) to the user. The location services platform 103 can be implemented using one or more computers or servers, for example using the chipset described in FIG. 6. Further, the location services platform 103 may include one or more platforms and may be run by one or more service providers.

A data collection module 111 of the UE 101 can collect location information (e.g., Global Positioning System (GPS) information based on one or more GPS satellites 113, Assisted GPS (A-GPS), cell of origin information, etc.), orientation information (e.g., magnetometer information, accelerometer information, etc.), combinations thereof, etc. to determine information utilized in requesting world data 107 from the location services platform 103. In certain embodiments, world data 107 or subsets of the world data 107 can be stored on the UE 101. The world data 107 can include map information. Map information may include maps, satellite images, street and path information, item information such as POI information, signing information associated with maps, objects and structures associated with the maps, information about people and the locations of people, coordinate information associated with the information, etc., or a combination thereof. An item may be an object (e.g., a representation of a physical object) or a virtual object (e.g., images, audio, video, icons, advertisements, etc.) that can be associated with a location. Further, world data 107 can include 3D detail about one or more objects or structures. In certain embodiments, a structure is an object that can be related to a physical object (e.g., a building, bridge, or other construction). The structures may additionally be partitioned to spread information. Partitioning information may be preprocessed and stored in the world data 107 or be processed at the UE 101 as detailed below. The 3D data stored in the world data 107 can be utilized to generate a virtual environment including one or more rough structure models (e.g., building models) registered accurately in a coordinate system. Further, one or more panoramic images can be associated with the virtual environment. As such, one or more of the 3D structure models can be associated with one or more images (e.g., panoramic images). The panoramic images can be associated with the models by utilizing one or more coordinates (e.g., GPS coordinates of the location the panoramic image was taken) as well as orientation information.

A POI can be a specific point location that a person may, for instance, find interesting or useful. Examples of POIs can include an airport, a bakery, a dam, a landmark, a restaurant, a hotel, a building, a park, the location of a person, or any point interesting, useful, or significant in some way. Further, POIs can include moving objects or points based on presence information. For example, presence information may include the location of a particular entity (e.g., person, group, etc.) based on GPS or other location information. A UE 101 of the entity can send location information to the location services platform 103, which can coordinate entity location information and allow for tracking of the entity.

A user of a UE 101 can execute an application 109 to view AR or MR information e.g., on a display, projection on a wall or in the air, etc. associated with the UE 101. The user can enter input search criteria to locate one or more POIs. The search criteria can be processed at the UE 101 or be utilized to query the location services platform 103 to retrieve information about the POIs. One or more other location services platforms can be utilized to retrieve the POI information. Further, POI information may come from other databases (e.g., a contact list associated with the UE 101, a messaging inbox, etc.). Moreover, the search criteria may include the name of a building or address identifying a building or structure associated with the location/POIs. Information about the structure (e.g., a number of floors associated with the structure, other partitioning information, etc.) can be received as well and cached by the UE 101. Other information about one or more POIs (e.g., an entity, shop, etc.) and/or metadata associated with the POIs (e.g., names, icons, pictures, floors, telephone numbers, web addresses, etc.) can be cached. Such information can be utilized to present augmented content to the user.

Further, one or more structures associated with the search are identified. The structures can be partitioned according to one or more processes. One such process is to perform analysis on one or more panoramic images of the structure using image analysis and/or pattern detection algorithms that can identify one or more features to be utilized in partitioning. For example, repeating horizontal features such as rows of windows can be utilized to determine floors (e.g., horizontal partitions that can be utilized for vertical separation). A floor detection algorithm can detect the amount of floors from resulting features. The results may be from a feature extraction that may be projected to respective walls of the structure.

This extraction process may be utilized to ease the processing requirements of the floor detection algorithm. Images showing the same building in different lighting conditions may be compared to make the detection of floors more accurate. For example, night time images may include lit windows making the visual features associated more prominent, which can lead to more accurate feature extraction.

The processing of images to determine partitions can be compared with POI information and/or structure information in one or more world data databases to verify the number of partitions to be associated with the structure. This can provide more accuracy in partition detection (e.g., floor detection). Additionally, an approximate height of a structure may be available from a structure model stored in world data 107 and can be utilized to check the validity of floor detection results. For example, a particular location's building codes may require that a floor of a building be at least or at maximum a certain height. This can be utilized to provide a floor or ceiling value of the number of floors possible for a building.

The location of the POI from the POI information (e.g., an address including a suite number, apartment number, floor number, etc.) can then be mapped to a portion of the structure. As such, the results can be presented to the user (e.g., as shown in FIG. 4B). The structure can be partitioned vertically using horizontal partitions as well as in other directions using other partitions. As such, individual floors of a structure can be divided into as many parts as there are POIs, addresses, etc. This information about the structure can come from the search information. In certain scenarios, the locations of the POIs need not correspond to the exact floor, but may be split corresponding to approximate locations. Additionally, in certain embodiments, floors need not be partitioned to provide further horizontal granularity within the floor. Moreover, POI information associated with a floor can be presented in various manners. For example, the POI information can be shown statically, as a ticker tape type animation on a wall of a structure, as rotating icons, etc. In certain embodiments, additional granularity can be accomplished (e.g., associating one or more POIs with particular locations on a floor). In these embodiments, the world data 107 may include floorplan information that can be utilized to determine the particular locations.

As previously noted, various applications can utilize the above mentioned approaches to annotate content. For example, the location services platform 103 can provide a service that utilizes images, 3D models, etc. of the real world environment. For example, an application 109 of the UE 101 can access a particular location based service, such as a local search for search results. When the search results are determined associated information can be sent to the UE 101 utilizing the world data 107. The search results for POIs can then be utilized to retrieve one or more images or other representations (e.g., based on a 3D model) associated with the resulting POIs. These images or representations, when presented to a user, can include a representation of the POIs based on the above described partitioning. As such, location based services utilize the annotation approaches described.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101 and location services platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the location services platform 103 may interact according to a client-server model with the applications 109 of the UE 101. According to the client-server model, a client process sends a message including a request to a server process, and the server process responds by providing a service (e.g., augmented reality image processing, augmented reality image retrieval, POI data retrieval, POI searching, structure information retrieval, etc.). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
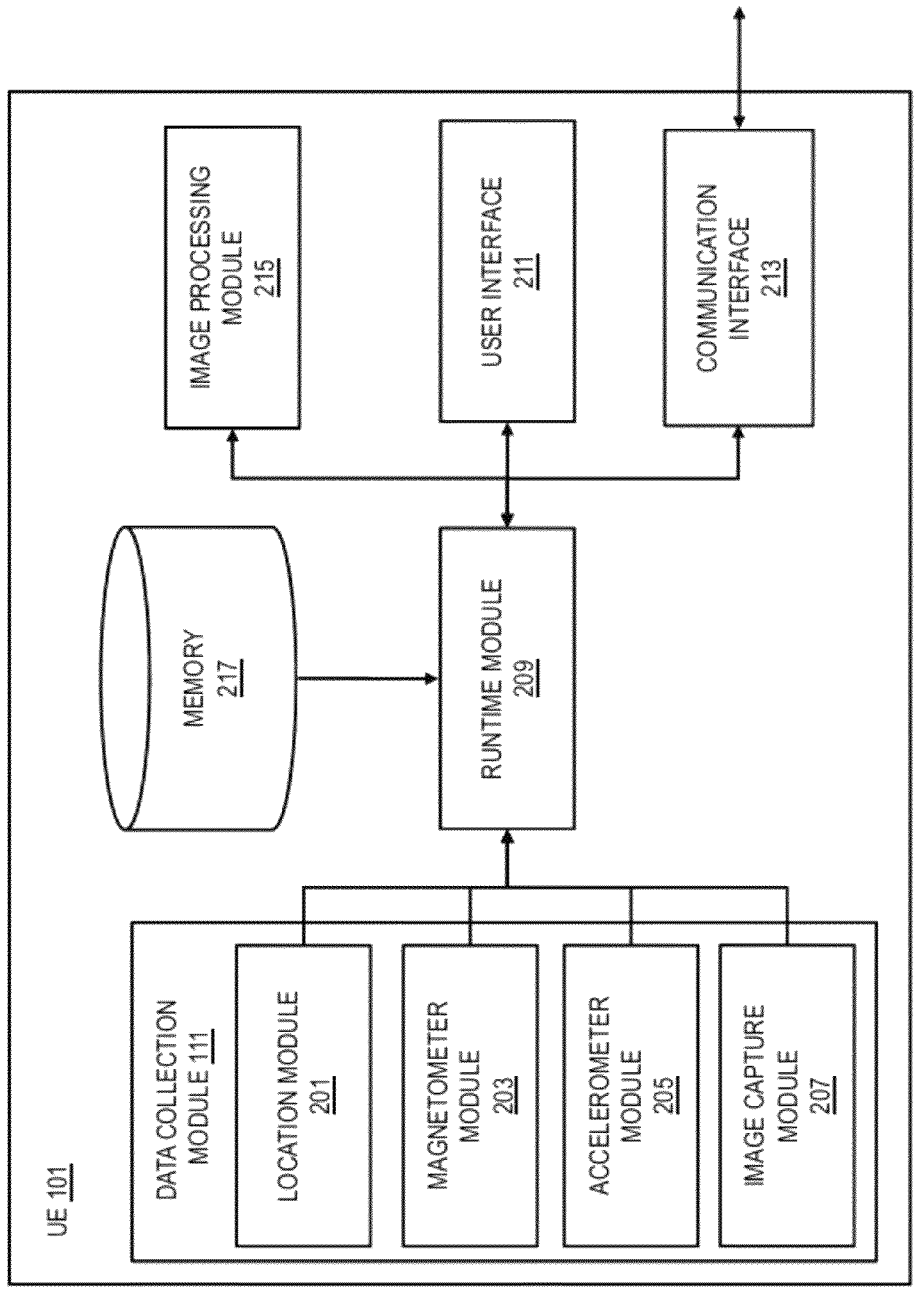
FIG. 2 is a diagram of the components of user equipment, according to one embodiment.

FIG. 2 is a diagram of the components of user equipment, according to one embodiment. By way of example, a UE 101 includes one or more components for providing a GUI with utilized in a location based services experience (e.g., AR, MR, etc.). It is contemplated that the functions of these components may be combined in one or more components or performed by other components of equivalent functionality. In this embodiment, the UE 101 includes a data collection module 111 that may include one or more location modules 201, magnetometer modules 203, accelerometer modules 205, and image capture modules 207. The UE 101 can also include a runtime module 209 to coordinate use of other components of the UE 101, a user interface 211, a communication interface 213, an image processing module 215, and memory 217. An application 109 (e.g., the location services application) of the UE 101 can execute on the runtime module 209 utilizing the components of the UE 101.

The location module 201 can determine a user's location. The user's location can be determined by a triangulation system such as GPS, A-GPS, Cell of Origin, or other location extrapolation technologies. Standard GPS and A-GPS systems can use satellites 113 to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 201 may also utilize multiple technologies to detect the location of the UE 101. Location coordinates (e.g., GPS coordinates) can give finer detail as to the location of the UE 101 when media (e.g., images, video, etc.) is captured. In one embodiment, GPS coordinates are embedded into metadata of captured media (e.g., images, video, etc.) or otherwise associated with the UE 101 by the application 109. In other embodiments, the location coordinates can be formatted in a file (e.g., as a vector) and sent to the location services platform 103 independently of any media. Moreover, in certain embodiments, the GPS coordinates can include an altitude to provide a height. The altitude can also be determined using another type of altimeter. In certain scenarios, the location module 201 can be a means for determining a location of the UE 101, an image, or used to associate POI or structure in view with a location. Additionally or alternatively, user input can be utilized to determine a location of interest.

The magnetometer module 203 can be used in finding horizontal orientation of the UE 101. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Calculations can be made to determine the direction of the UE 101. In one embodiment, horizontal directional data obtained from a magnetometer is embedded into the metadata of captured or streaming media or otherwise associated with the UE 101 (e.g., by including the information in a request to a location services platform 103) by a location services application 109. For example, the request can be utilized to retrieve information associated with a particular location, one or more POIs, one or more structures, etc.

The accelerometer module 205 can be used to determine vertical orientation of the UE 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 205 can determine the angle the UE 101 is pointed as compared to Earth's gravity. In one embodiment, vertical directional data obtained from an accelerometer is embedded into the metadata of captured or streaming media or otherwise associated with the UE 101 by the location services application 109. In certain scenarios, the magnetometer module 203 and accelerometer module 205 can be means for ascertaining a perspective of a user. Further, the orientation in association with the user's location can be utilized to map the location of the UE 101 to one or more images (e.g., panoramic images and/or camera view images) and/or a 3D model view. With such orientation information, a location services application 109 can determine one or more POIs, structures, etc. with respect to the UE 101. Further, the orientation information can be utilized in the presentation of POI information (e.g., annotations) to the user on the user interface 211 of the UE 101.

In one embodiment, the communication interface 213 can be used to communicate with a location services platform 103 or other UEs 101. Certain communications can be via methods such as an internet protocol, messaging (e.g., SMS, MMS, etc.), or any other communication method (e.g., via the communication network 105). In some examples, the UE 101 can send a request to the location services platform 103 via the communication interface 213. The location services platform 103 may then send a response back via the communication interface 213. In certain embodiments, location and/or orientation information is used to generate a request to the location services platform 103 for one or more images (e.g., panoramic images) of one or more objects, one or more map location information, a 3D map, etc.

The image capture module 207 can be connected to one or more media capture devices. The image capture module 207 can include optical sensors and circuitry that can convert optical images into a digital format. Examples of image capture modules 207 include cameras, camcorders, etc. Moreover, the image capture module 207 can process incoming data from the media capture devices. For example, the image capture module 207 can receive a video feed of information relating to a real world environment (e.g., while executing the location services application 109 via the runtime module 209). The image capture module 207 can capture one or more images from the information and/or sets of images (e.g., video). These images can be sent to the location services platform 103 for processing or be processed at the image processing module 215. The image processing module 215 can, for example, detect one or more POIs and/or structures associated with a location and/or orientation. Further, the image processing module 215 and/or location services platform 103 can determine one or more floors associated with a structure based on one or more algorithms. In certain embodiments, one or more features of the structure can be determined using the image processing module 215 and/or location services platform 103 that can be used to determine one or more partitions associated with the structure. Representations of POIs associated with the structure can then be presented via the user interface 211. The image processing module 215 may be implemented via one or more processors, graphics processors, etc. In certain embodiments, the image capture module 207 can be a means for determining one or more images.

The user interface 211 can include various methods of communication. For example, the user interface 211 can have outputs including a visual component (e.g., a screen), an audio component, a physical component (e.g., vibrations), and other methods of communication. User inputs can include a touch-screen interface, a scroll-and-click interface, a button interface, a microphone, etc. Moreover, the user interface 211 may be used to display maps, navigation information, camera images and streams, augmented reality application information, POIs, virtual reality map images, panoramic images, etc. from the memory 217 and/or received over the communication interface 213. Input can be via one or more methods such as voice input, textual input, typed input, typed touch-screen input, other touch-enabled input, etc. In certain embodiments, the user interface 211 and/or runtime module 209 can be means for causing presentation of display information.

In certain embodiments the memory 217 can store information about one or more POIs that are not public to other users. For example, contact information stored in a contact list can include information available in a virtual contact card or entered by the user including location information (e.g., an address) and an identifier of the contact. In this manner, the user can select the contact as a POI for which the user is looking to view information about. Additionally or alternatively, the user can request such information from another source (e.g., an address database). In certain embodiments the other sources can be private sources. For example, the user may have a transponder attached to the user's vehicle that may used to make the vehicle an identifiable POI.

Figure 3:
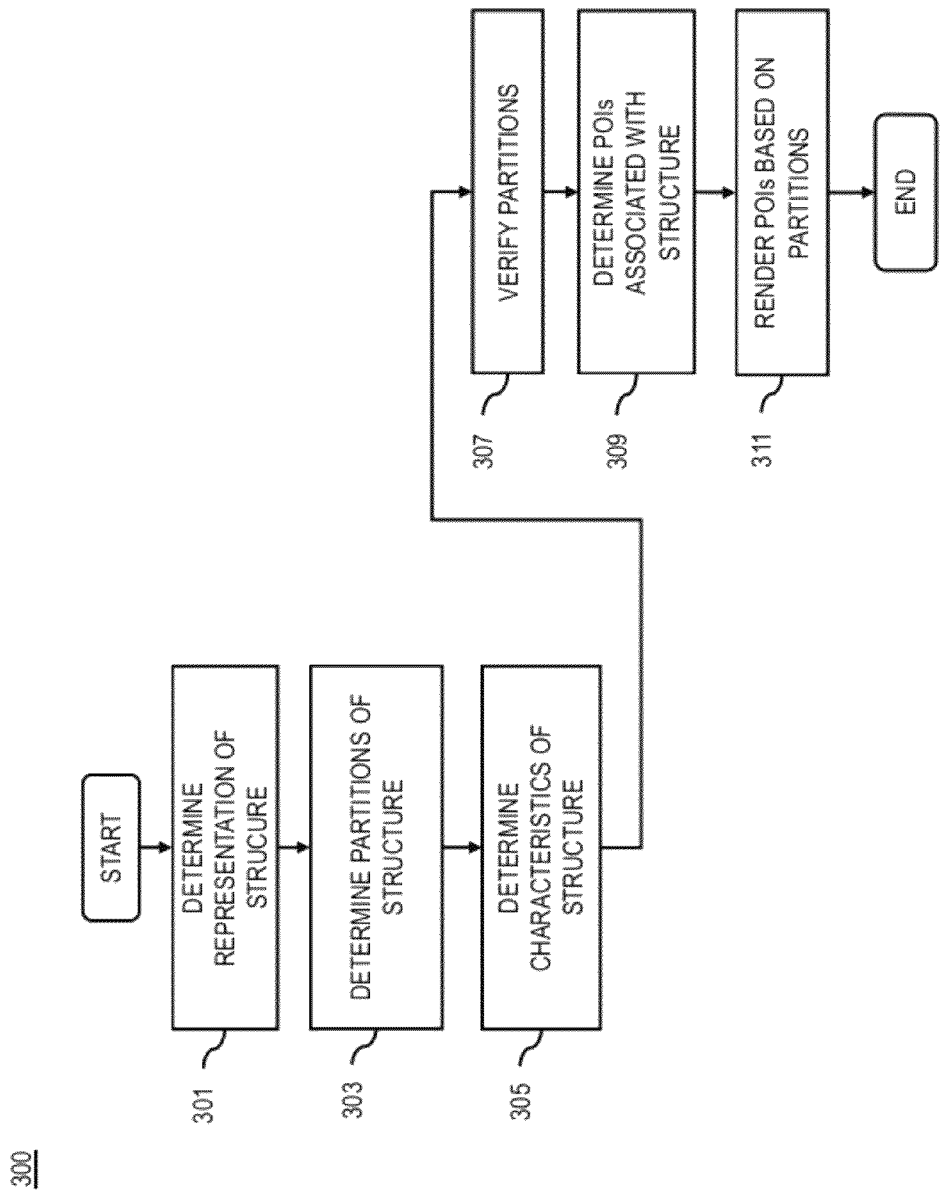
FIG. 3 is a flowchart of a process for rendering point of interest information based on partitions of structures, according to one embodiment.
Figure 6:
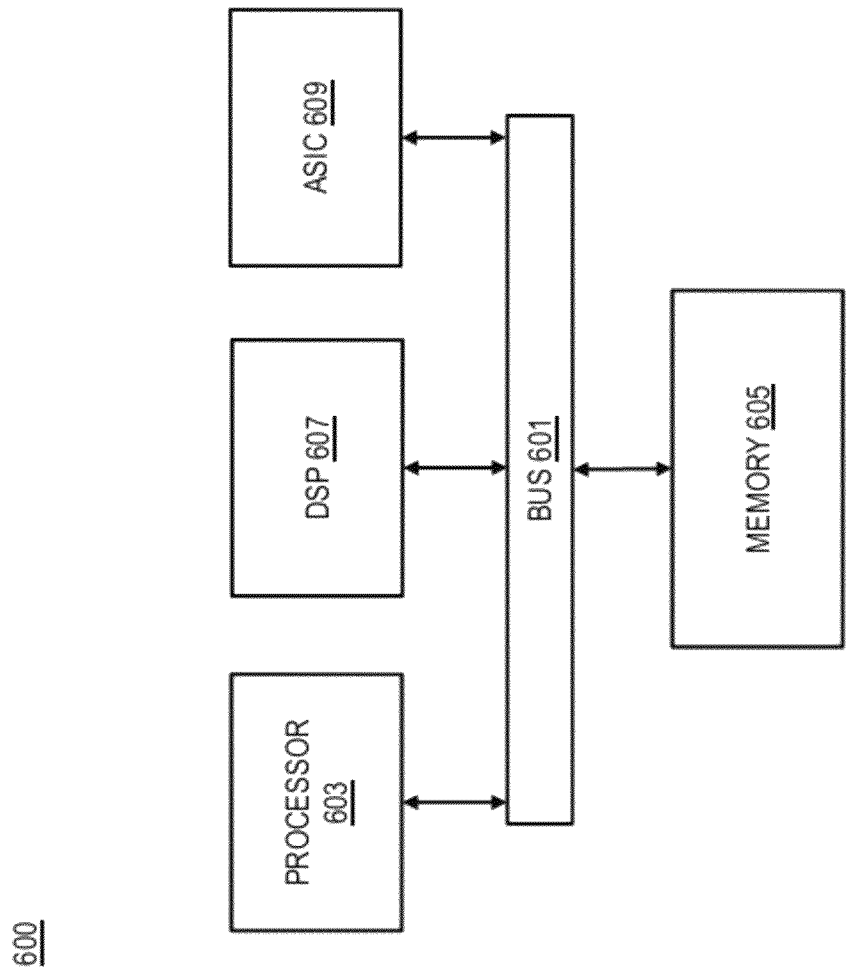
FIG. 6 is a diagram of a chip set that can be used to implement an embodiment of the invention.

FIG. 3 is a flowchart of a process for rendering point of interest information based on partitions, according to one embodiment. In one embodiment, a location services application 109 (e.g., executing on the runtime module 209 of the UE 101) performs the process 300 and is implemented in, for instance, a chip set including a processor and a memory as shown in FIG. 6. Additionally or alternatively, one or more portions of the process 300 can be implemented via another device (e.g., the location services platform 103). As such, the runtime module 209 and/or other devices can be utilized as means for implementing one or more steps of the process 300.

A user of the UE 101 can utilize a location services application 109 to view location based content on the UE 101. The location services application 109 can be utilized to provide AR or MR features to users. In one embodiment, the user can input information into the UE 101 about a location (e.g., an address). Additionally or alternatively, the UE 101 can determine a location based on one or more sensors of the UE 101. Moreover, the application 109 can determine one or more representations of at least one structure (step 301). This may be based on the location information, for example, the representation can include one or more portions of a panoramic image or 3D model retrieved from world data 107 based on the location information (e.g., GPS coordinates, orientation information, an address, etc.). Additionally or alternatively, the representation can be generated from one or more image sensors (e.g., via the image capture module 207).

Then, at step 303, the application 109 can determine one or more partitions of the at least one structure based, at least in part, on one or more features of the one or more representations. As previously noted, the partitions can include horizontal partitions utilized for vertical separation, vertical partitions utilized for horizontal separation, other types of partitions, combinations thereof, etc. For example, horizontal partitions can be utilized to represent one or more floors of a structure. The features can include architectural details of the structure that are detectable in one or more of the representations. For example, the details can include detected windows, building features (e.g., roof, pillars, protrusions, etc.), or the like from the representations. The detected features can then be processed to determine the partitions. For example, the partitions can be determined based on one or more algorithms to detect partitions based on detected windows. For example, a row of windows on a building can be indicative of a floor partition. The use of more than one representation of the structure under different lighting conditions, environmental conditions, etc. can provide further confidence that the detection algorithm is proper. For example, a representation of the structure at night may have lights on inside of the windows of the structure. The lighting can thus provide additional contrast to detect the window features. Various environmental conditions (e.g., a sunny day) can additionally provide feature extraction confidence. For example, a representation on a sunny day may show features more clearly than a representation during a storm.

Then, at step 305, the application 109 can determine one or more characteristics of the structure. The characteristics can include information stored in one or more databases related to the structure and/or POIs in the structure. For example, it can be determined from a directory associated with the structure how many floors are associated with the structure. Moreover, blueprints of the structure, building codes, POI information, etc. can be utilized. For example, if POIs associated with a structure (e.g., based on an address) include information indicating a floor (e.g., an apartment number where a first group on numbers include a floor, a suite number, a floor number, etc.), then there is more confidence that the structure includes at least that many floors. This information can be utilized to verify or update the one or more partitions determined based on the features (step 307). The verification can include a comparison of the partitions detected based on the features and the characteristics.

Moreover, the application 109 can determine one or more POIs associated with the structure (step 309). The POIs can be determined by querying world data 107, an internal memory of the UE 101, or the like. For example, the world data 107 can include a database and/or data structures associated with one or more particular structures. As such, POIs can be associated with the structures in the database. Additionally or alternatively, the POIs can be stored in a separate database than structure information. Here, POI information can be associated or correlated to the structure based on other information (e.g., an address, location coordinates, etc.). For example, a POI database may include POI information based on a data structure including, e.g., a name of the POI, information describing the POI, location information, associated structure information, combinations thereof, etc. The location information may be utilized to select the POI and/or structure. Thus, the application 109 can determine one or more characteristics (e.g., location information, structure information, etc.) of the POIs. For example, the characteristics can be based on a floorplan of the structure, a blueprint of the structure, combinations thereof, etc. that may include POI information. Additionally or alternatively, a height of the structure may be utilized for verification. This can be useful if a portion of the structure is obstructed (e.g., by trees). A heuristic based analysis can be done based on the height of the structure. For example, historically, a floor is usually about 3 meters, which can be utilized to evenly split floor partitions. A database including such information may be used to determine features and/or verify/update partitions.

Then, at step 311, the application 109 can determine to render the one or more POIs for presentation (e.g., in a display) based, at least in part, on the one or more partitions. For example, the application 109 can cause presentation of a rendering of the structure (e.g., based on an image database and/or one or more images captured by the UE 101). The application 109 can then cause presentation of representations of the determined POIs associated with the structure. The representations can include POI information and be presented based on the partitions as further shown in FIGS. 4A and 4B. The POI information can include a description of the POI (e.g., a contact name, a name of a location, the name of a shop, features available at the POI, etc.) as well as labels and other representations, such as icons. The information can be presented as an overlay, an augmentation, an annotation, or the like. An advantage of showing the POI information based on the partitions is that more granularity can be shown to the user.

In one embodiment, the user may be presented with an option to change or modify the associations of POIs and partitions. For example, the user can be presented with an editing option to allow the user to edit the amount of partitions associated with a structure manually. In certain embodiments, these changes can be stored on the UE 101. In other embodiments, the changes can be stored at the location services platform 103 and utilized for other users. The user can change the partitions via the user interface. Additionally or alternatively, user input may be utilized to modify an algorithm for determining partitions. For example, the user may input a height per floor ration to an algorithm to determine the number of floors in a building. Further, outlines of windows and other visual features (e.g., repeating visual features) on structure facades can be used to limit the presentation of floors. In this manner, floors that are used for utility purposes (e.g., elevator motors, air conditioning, etc.) need not conflict with floors that the user may be interested in viewing.

In one embodiment, a large structure, such as a stadium, can be presented to a user. In this embodiment, the structure may be divided into one or more sections based on one or more partitions. For example, there may be different sections where customers can buy tickets to set in. A sensor of the UE 101 (e.g., a bar code sensor, camera, etc.) or another input (e.g., a keypad) can be utilized to determine a particular section of the stadium that is interesting to the user. The particular section is then compared to stadium information (e.g., a blueprint of the stadium, a section coordinate graph, etc.). The comparison can be utilized to determine a location of the stadium to augment with an annotation that a representation (e.g., streaming image) is associated with the particular section. The section can additionally be highlighted (e.g., via an overlay coloring, an outline, etc.) to emphasize the location.

Figure 4A:
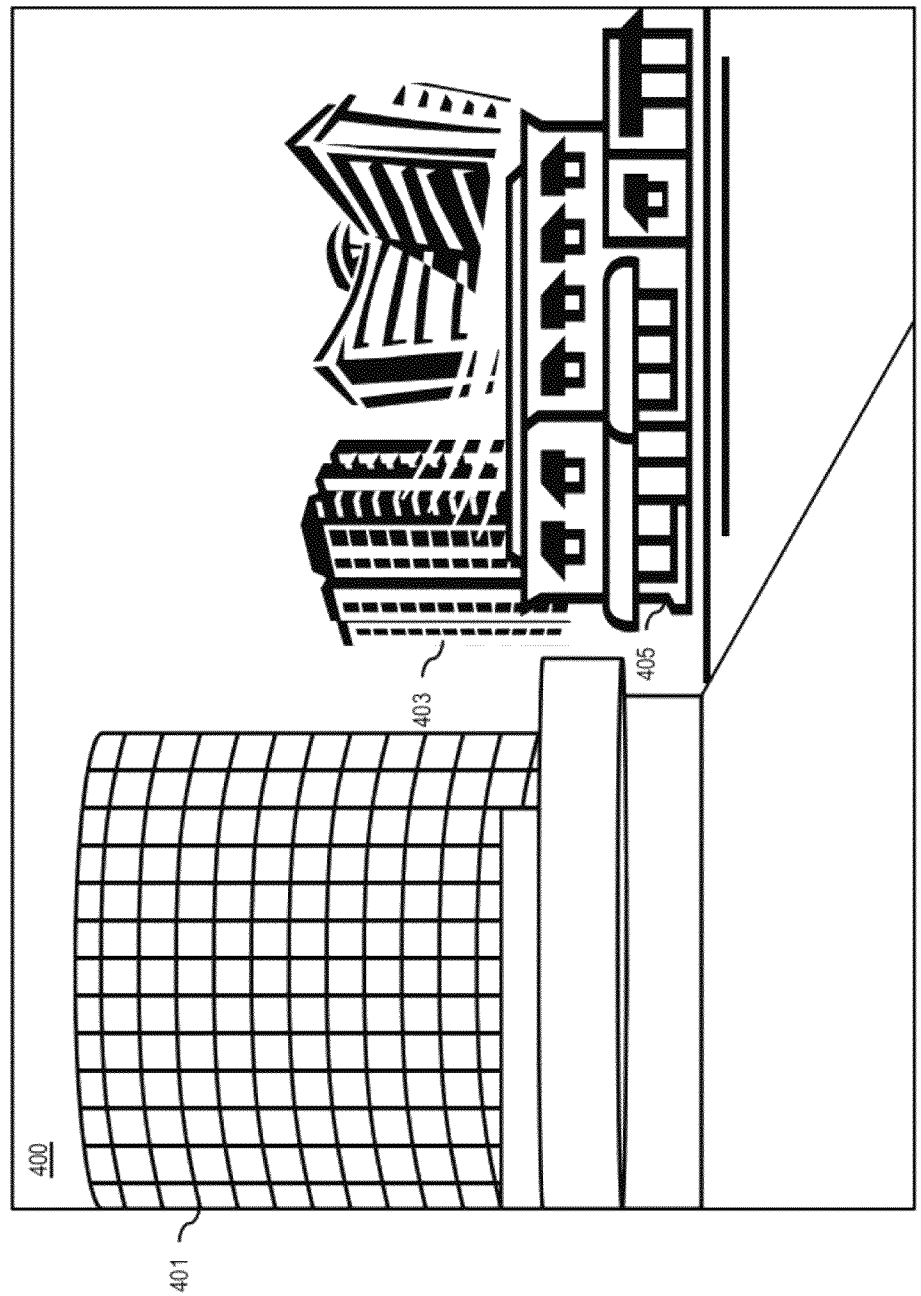

FIGS. 4A-4B are diagrams of user interfaces utilized in the processes of FIG. 3, according to various embodiments. FIG. 4A shows a base image user interface 400 that can be utilized by a user of a UE 101 utilizing a location based application. The image can include one or more structures 401, 403, 405. POIs associated with the structures can be found using location information and/or search information of input by a user. Further, the image can be part of a viewfinder of a camera portion of the UE 101 and/or an image database. POI content can be overlaid on the user interface 400.

User interface 420 shows the base user interface 400 with additional content associated with POIs. As shown, the user interface 420 includes POIs 421, 423, 425, 427, 429 shown on various partitions of a structure 401. The vertical separation can be utilized to show the user that different floors of the structure 401 are associated with different POIs. As previously noted, one or more rows of windows 431a-431e can be utilized to determine horizontal partitions and the POI representations presented 421, 423, 425, 427, 429 can be associated with partitions based on POI information (e.g., address information associated with the POI). Further, the horizontal separation can be approximated based on POI information and/or other types of selection. For example, Joe Bob 425 and the Bank 427 can be associated with the same floor, but also be horizontally separated based on floorplan information and/or random selection.

With the above approaches, separation of POIs associated with a structure is possible. As such, users of applications can view POI information with separation, allowing for the user to more clearly distinguish between POIs and graphically place POIs. This is accomplished by providing an additional dimension for information visualization based on partitioning. The approach also enables applications to provide additional accuracy in POI information presented to users. Additionally, confidential information items (e.g., contact information stored on a UE 101) can be retrieved directly from the user's UE 101 enabling additional privacy for the user. As such, information shared to the user can be seen on the user's UE 101, but not on another user's UE 101 that does not have access to the shared information (e.g., contact information, presence information of a contact, etc.).

The processes described herein for annotating point of interest information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
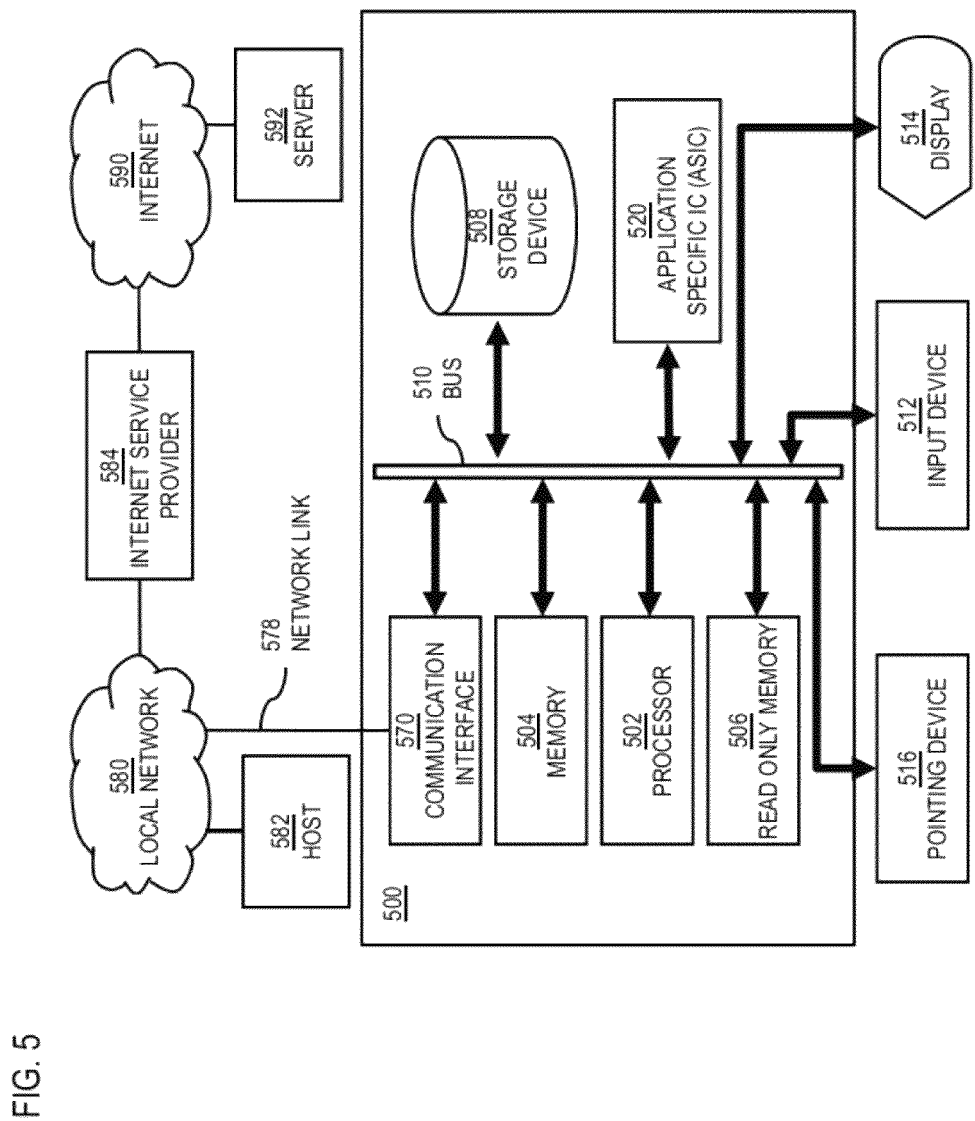
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to annotate point of interest information as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of annotating point of interest information.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to annotate point of interest information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for annotating point of interest information. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for annotating point of interest information, is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to annotate point of interest information as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of annotating point of interest information.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to annotate point of interest information. The memory 605 also stores the data associated with or generated by the execution of the inventive steps.

Figure 7:
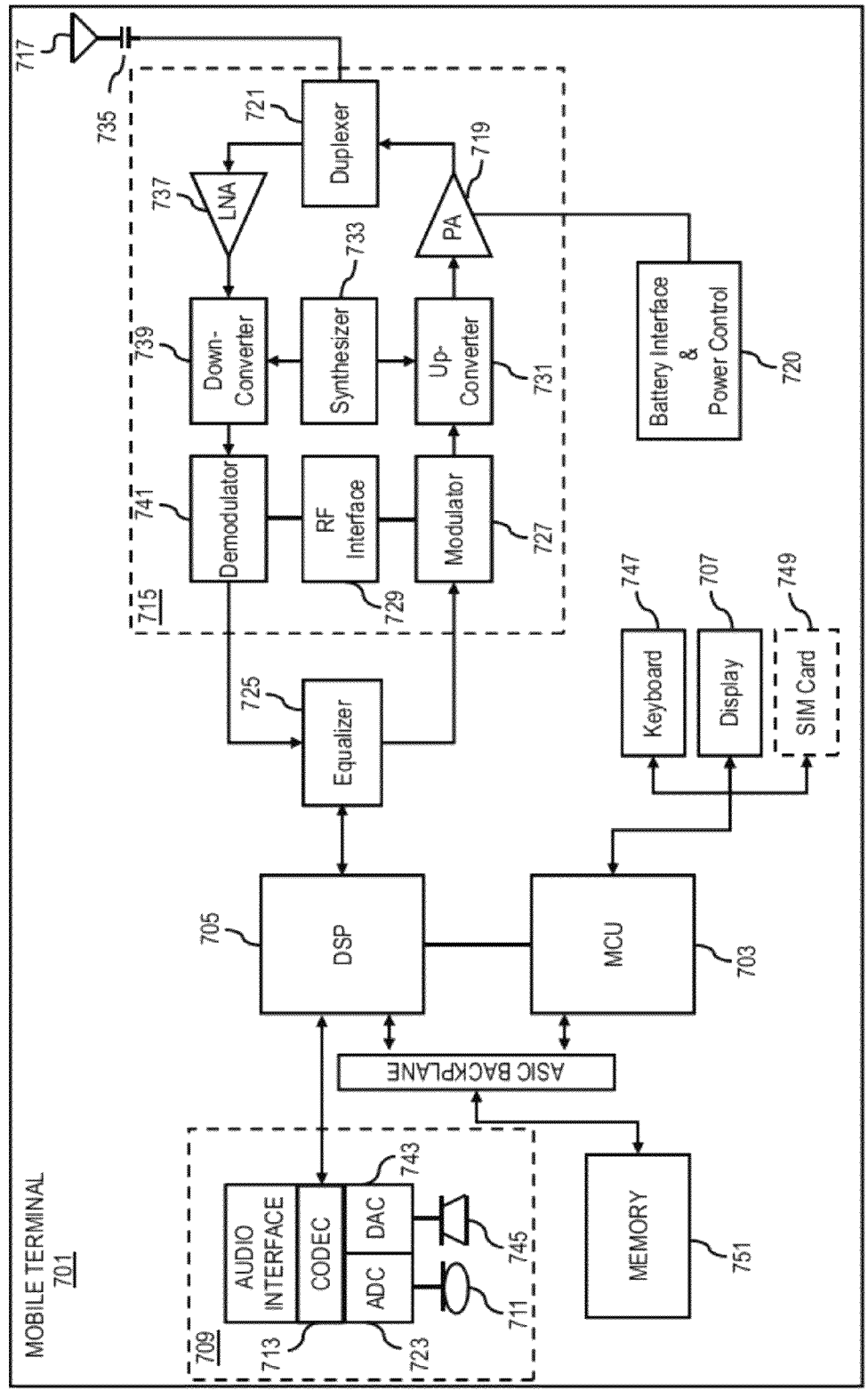
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of annotating point of interest information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of annotating point of interest information. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to annotate point of interest information. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining, by at least one processor, one or more visual representations of at least one structure;
    detecting from the one or more visual representations of the at least one structure one or more visual features;
    determining one or more partitions of the at least one structure based, at least in part, on the one or more visual features detected from the one or more visual representations;
    determining one or more points of interest associated with the at least one structure; and
    determining to render the one or more points of interests for presentation based, at least in part, on the one or more partitions.

2. A method of claim 1, further comprising:
    determining one or more characteristics of the at least one structure; and
    determining to verify the one or more partitions, to update the one or more partitions, or a combination thereof based, at least in part, on the one or more characteristics.

3. A method of claim 1, wherein the one or more partitions include one or more horizontal partitions, one or more vertical partitions, or a combination thereof.

4. A method of claim 1, further comprising:
    determining one or more characteristics of at least one of the points of interest;
    determining to map the rendering of the at least one point of interest to the one or more partitions based, at least in part, on the one or more characteristics; and
    determining to present one or more editing options to modify an association of the at least one point of interest and the one or more partitions.

5. A method of claim 4, wherein the one or more characteristics are determined based, at least in part, on a floorplan of the at least one structure.

6. A method of claim 1, wherein the one or more visual features detected in the one or more visual representations include architectural details of the at least one structure.

7. A method of claim 1, wherein the one or more partitions represent one or more floors of the at least one structure.

8. A method of claim 1, further comprising:
    determining to compare the one or more visual representations of the at least one structure under different lighting conditions,
    wherein the one or more visual representations depict the at least one structure under the different lighting conditions, an environmental conditions, or a combination thereof.

9. An apparatus comprising:
    at least one processor; and
    at least one memory including computer program code for one or more programs,
    the at least one memory and the computer program code configured to, with the at least one processor, cause the apparatus to perform at least the following,
        determine one or more visual representations of at least one structure;
        detect from the one or more visual representations of the at least one structure one or more visual features;
        determine one or more partitions of the at least one structure based, at least in part, on the one or more visual features detected from the one or more visual representations;
        determine one or more points of interest associated with the at least one structure; and
        determine to render the one or more points of interests for presentation based, at least in part, on the one or more partitions.

10. An apparatus of claim 9, wherein the apparatus is further caused to:
    determine one or more characteristics of the at least one structure; and determine to verify the one or more partitions, to update the one or more partitions, or a combination thereof based, at least in part, on the one or more characteristics.

11. An apparatus of claim 9, wherein the one or more partitions include one or more horizontal partitions, one or more vertical partitions, or a combination thereof.

12. An apparatus of claim 9, wherein the apparatus is further caused to:
determine one or more characteristics of at least one of the points of interest;
determine to map the rendering of the at least one point of interest to the one or more partitions based, at least in part, on the one or more characteristics; and
determine to present one or more editing options to modify an association of the at least one point of interest and the one or more partitions.

13. An apparatus of claim 12, wherein the one or more characteristics are determined based, at least in part, on a floorplan of the at least one structure.

14. An apparatus of claim 9, wherein the one or more visual features detected in the one or more visual representations include architectural details of the at least one structure.

15. An apparatus of claim 9, wherein the one or more partitions represent one or more floors of the at least one structure.

16. An apparatus of claim 9, wherein the apparatus is further caused to:
determine to compare the one or more visual representations of the at least one structure under different lighting conditions,
wherein the one or more visual representations depict the at least one structure under the different lighting conditions, an environmental conditions, or a combination thereof.

17. A non-transitory computer-readable storage medium carrying one or more sequences of one or more instructions which, when executed by one or more processors, cause an apparatus to at least perform the following steps:
determining one or more visual representations of at least one structure;
detecting from the one or more visual representations of the at least one structure one or more visual features;
determining one or more partitions of the at least one structure based, at least in part, on the one or more visual features detected from the one or more visual representations;
determining one or more points of interest associated with the at least one structure; and
determining to render the one or more points of interests for presentation based, at least in part, on the one or more partitions.

18. A non-transitory computer-readable storage medium of claim 17, wherein the apparatus is caused to further perform:
determining to compare the one or more visual representations of the at least one structure under different lighting conditions;
determining one or more characteristics of the at least one structure; and
determining to verify the one or more partitions, to update the one or more partitions, or a combination thereof based, at least in part, on the one or more characteristics.

19. A non-transitory computer-readable storage medium of claim 17, wherein the one or more partitions include one or more horizontal partitions, one or more vertical partitions, or a combination thereof.

20. A non-transitory computer-readable storage medium of claim 17, wherein the apparatus is caused to further perform:
determining one or more characteristics of at least one of the points of interest;
determining to map the rendering of the at least one point of interest to the one or more partitions based, at least in part, on the one or more characteristics; and
determining to present one or more editing options to modify an association of the at least one point of interest and the one or more partitions.

* * * * *